(12) United States Patent
Schweizer et al.

(10) Patent No.: US 9,753,128 B2
(45) Date of Patent: Sep. 5, 2017

(54) MULTI-PATH COMPENSATION USING MULTIPLE MODULATION FREQUENCIES IN TIME OF FLIGHT SENSOR

(75) Inventors: Matthias Schweizer, Lenzburg (CH); Thierry Oggier, Zurich (CH); Bernhard Buettgen, Adliswil (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 639 days.

(21) Appl. No.: 13/189,903

(22) Filed: Jul. 25, 2011

(65) Prior Publication Data

US 2012/0033045 A1 Feb. 9, 2012

Related U.S. Application Data

(60) Provisional application No. 61/367,091, filed on Jul. 23, 2010.

(51) Int. Cl.
G01C 3/00 (2006.01)
G01S 13/08 (2006.01)
G01C 3/08 (2006.01)
G01S 7/491 (2006.01)
G01S 17/36 (2006.01)
H04N 13/02 (2006.01)
G01S 17/89 (2006.01)

(52) U.S. Cl.
CPC ............ G01S 7/4912 (2013.01); G01S 17/36 (2013.01); G01S 17/89 (2013.01); H04N 13/0207 (2013.01)

(58) Field of Classification Search
CPC ...................................... G01S 17/36
See application file for complete search history.

(56) References Cited

U.S. PATENT DOCUMENTS

| | | | | |
|---|---|---|---|---|
| 7,259,715 | B1* | 8/2007 | Garren | G01S 13/003 342/159 |
| 7,405,812 | B1* | 7/2008 | Bamji | 356/5.1 |
| 7,872,583 | B1* | 1/2011 | Yushkov et al. | 340/572.1 |
| 8,195,425 | B2* | 6/2012 | Borgaonkar | G01S 5/22 342/145 |
| 8,406,280 | B2* | 3/2013 | Draganov | G01S 19/22 342/350 |
| 8,577,089 | B2* | 11/2013 | Choi et al. | 382/106 |
| 2001/0021011 | A1* | 9/2001 | Ono | G06T 7/0073 356/3 |
| 2006/0033929 | A1* | 2/2006 | Towers et al. | 356/489 |
| 2006/0241371 | A1* | 10/2006 | Rafii | G01S 17/89 600/407 |
| 2006/0274818 | A1* | 12/2006 | Gilmour | H04B 1/7085 375/146 |
| 2010/0002950 | A1* | 1/2010 | Arieli | G01B 9/02087 382/255 |

(Continued)

OTHER PUBLICATIONS

B. Buttgen, H. A. El Mechat, F. Lustenberger and P. Seitz "Pseudonoise optical modulation for real-time 3-D imaging with minimum interference", IEEE Trans. Circuits Syst., vol. 54, No. 10, pp. 2109-2119 2007.*

(Continued)

*Primary Examiner* — Joseph Ustaris
*Assistant Examiner* — Rebecca Volentine
(74) *Attorney, Agent, or Firm* — Fish & Richardson P.C.

(57) ABSTRACT

A method to compensate for multi-path in time-of-flight (TOF) three dimensional (3D) cameras applies different modulation frequencies in order to calculate/estimate the error vector. Multi-path in 3D TOF cameras might be caused by one of the two following sources: stray light artifacts in the TOF camera systems and multiple reflections in the scene. The proposed method compensates for the errors caused by both sources by implementing multiple modulation frequencies.

10 Claims, 8 Drawing Sheets

(56) References Cited

U.S. PATENT DOCUMENTS

| | | | |
|---|---|---|---|
| 2010/0128109 A1* | 5/2010 | Banks | G01S 7/4816 348/46 |
| 2010/0270376 A1* | 10/2010 | McQueen | G06K 7/10722 235/462.11 |
| 2011/0176709 A1* | 7/2011 | Park | G06T 7/0057 382/106 |
| 2011/0188028 A1* | 8/2011 | Hui | G01C 3/08 356/5.01 |
| 2011/0199621 A1* | 8/2011 | Robinson | G01S 17/89 356/628 |
| 2012/0001795 A1* | 1/2012 | DeLaurentis | G01S 13/90 342/25 F |
| 2012/0008128 A1* | 1/2012 | Bamji | 356/5.01 |

OTHER PUBLICATIONS

A. D. Payne, A. P. P. Jongenelen, A. A. Dorrington, M. J. Cree, and D. A. Carnegie, "Multiple frequency range imaging to remove measurment ambiguity," in 9th Conference on Optical 3-D Measurement Techniques, 2009.*

Pascazio, V.; Schirinzi, G., "Multifrequency InSAR height reconstruction through maximum likelihood estimation of local planes parameters," Image Processing, IEEE Transactions on , vol. 11, No. 12, pp. 1478,1489, Dec. 2002 doi: 10.1109/TIP.2002.804274.*

Wei Xu; Ee-Chien Chang; Leong Keong Kwoh; Hock Lim; Wang Cheng; Heng, A, "Phase-unwrapping of SAR interferogram with multi-frequency or multi-baseline," Geoscience and Remote Sensing Symposium, 1994. IGARSS '94. Surface and Atmospheric Remote Sensing: Technologies, Data Analysis and Interpretation., International , vol. 2, No., pp. 730,732 vol. 2, 8-1.*

Kavli, Tom, et al. "Modelling and compensating measurement errors caused by scattering in time-of-flight cameras." Optical Engineering+ Applications. International Society for Optics and Photonics, 2008.*

Falie, D. "3D image correction for time of flight (ToF) cameras." International Conference of Optical Instrument and Technology. International Society for Optics and Photonics, 2008. APA.*

Dorrington, A.A. et al., "Separating true range measurements from multi-path and scattering interference in commercial range cameras." Proc. SPIE 7864, Three-Dimensional Imaging, Interaction, and Measurement, 786404 (Jan. 27, 2011).

* cited by examiner

MULTI-PATH COMPENSATION USING MULTIPLE MODULATION FREQUENCIES IN TIME OF FLIGHT SENSOR

RELATED APPLICATIONS

This application claims the benefit under 35 USC 119(e) of U.S. Provisional Application No. 61/367,091, filed on Jul. 23, 2010, which is incorporated herein by reference in its entirety.

BACKGROUND OF THE INVENTION

Three dimensional (3D) imaging time-of-flight (TOF) cameras are an active-type system. In general, systems are based on the phase-measurement technique of emitted intensity-modulated light, which is reflected by the scene. The reflected light is imaged onto a sensor. The photo-generated electrons are demodulated in the sensor, and based on the phase information, the distance for each pixel is deduced.

A major problem of a TOF system is that the sensor has to handle high dynamic ranges. The modulated signal received by the camera drops with the square of the distance. Furthermore, the reflectivity of the targets might vary to a large degree.

FIG. 1 illustrates a scene with a high dynamic range. The image detected by TOF camera 100 contains a bright object 10 at 30 centimeters (cm) with a reflectivity of 100% and a dark object 12 at 300 cm with a reflectivity of 10%. Therefore, the dynamic range, for objects 10, 12 at the same distance, becomes:

$$DR = \frac{300^2 * 100}{30^2 * 10} = 1'000$$

Due to this high requirement on dynamic range, stray light originating from the strong signal adding to the weak signal is a dominant problem for numerous applications of the TOF technology.

Stray light in TOF systems can also come from the camera itself.

FIG. 2 illustrates stray light that is generated by the non-ideal optical path 14 in the camera system 100. A non-ideal path 14 is sketched that originates from reflections between the lens (objective) system 110 and the sensor or imager chip 200. However, stray light might also have been generated by the lenses inside the objective or by an optical filter such as a bandpass filter added in the optical path.

Again, the stray light problem is exacerbated by the presence of relatively bright (reflective) objects 10 and dark (absorbing) objects 12 within the same scene. Light 16 from the bright object 10 contributes to the response detected by the pixels that receive the light 18 from the dark object 12 as illustrated by the internal reflections that give rise to the non-ideal path 14.

FIG. 3 illustrates the impact of stray light for the case of a phase-measuring 3D TOF system.

Signal A from object A (10) on pixel A: strong signal=large amplitude

Signal B from object B (12) on pixel B: weak signal=small amplitude

S=Signal due to stray light from object A on pixel B

B'=Resulting (measured) signal on pixel B

SUMMARY OF THE INVENTION

The invention proposes the use of more than one modulation frequency in order to compensate for multi-path measurement errors, that is means phase measurement errors caused by stray light and/or multiple reflections in the scene.

In general, according to one aspect, the invention features a time of flight three dimensional imaging system. This system comprises an illumination module that generates modulated light that is intensity modulated at a first frequency and at a second frequency, a sensor that detects the modulated light at the first frequency and at the second frequency, and a controller that generates a three dimensional image from the detected modulated light and compensates for multipath error in the three dimensional image.

In an embodiment, the controller determines a vector associated with the multipath error and corrects a depth measured by the controller based on the vector and uses iterative approximations to determine the vector.

In general, according to one aspect, the invention features a time of flight three dimensional imaging method. The method comprises generating modulated light that is intensity modulated at a first frequency and at a second frequency, detecting the modulated light at the first frequency and at the second frequency, generating a three dimensional image from the detected modulated light, and compensating the three dimensional image for multipath error.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
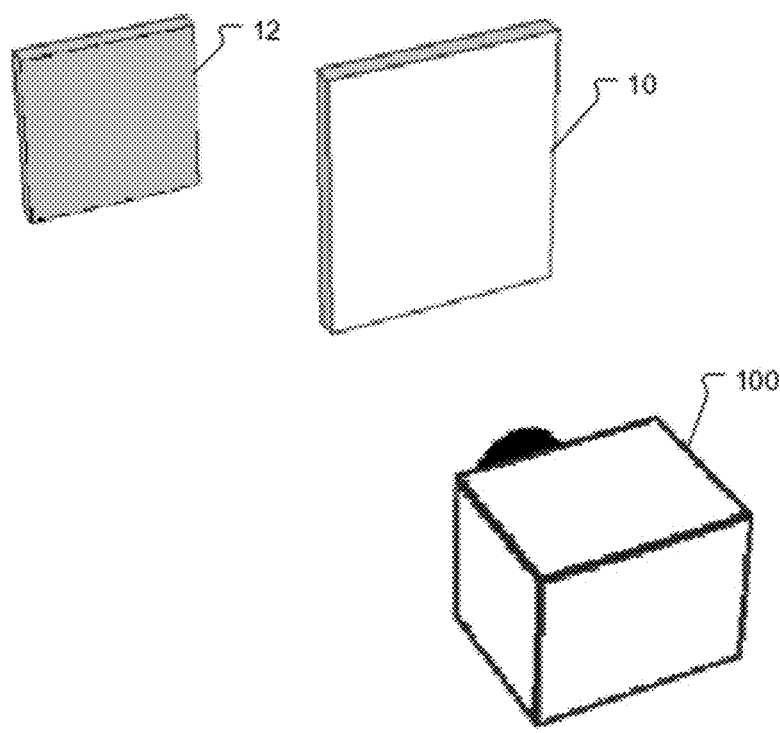
FIG. 1 is a schematic perspective drawing illustrating the situation with a high reflective object close to the camera and low reflective object far away.
Figure 2:
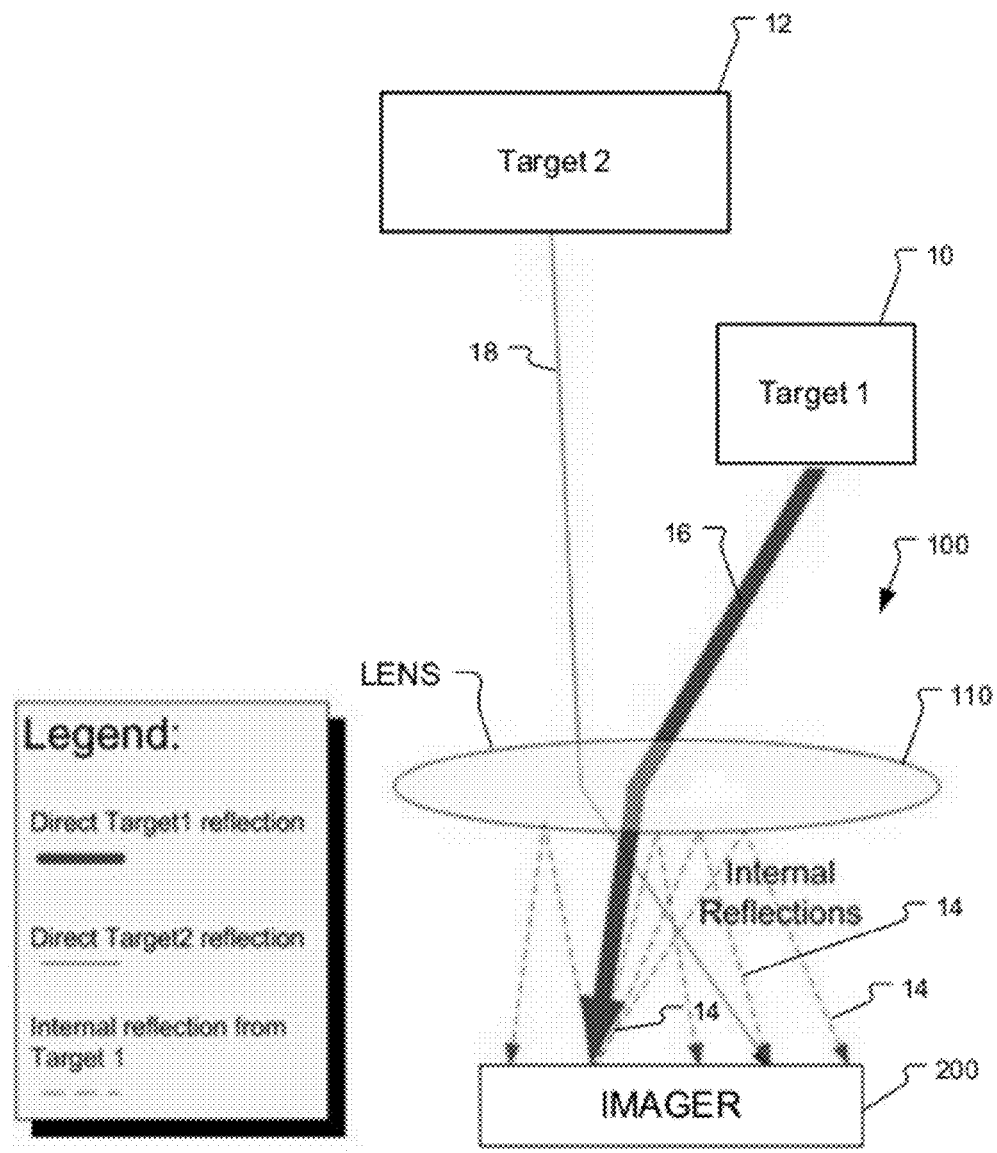
FIG. 2 is a schematic view showing an optical path having internal reflections (stray light) within the camera.
Figure 3B:
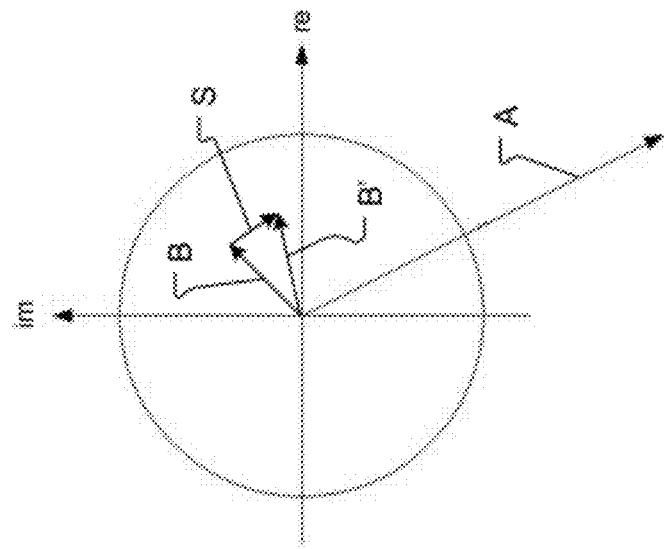
FIG. 3A is a phase diagram showing an ideal system without any stray light and FIG. 3B is a phase diagram showing stray light from a bright object (A) causing a phase shift on the measurement of dark object (B)
Figure 3A:
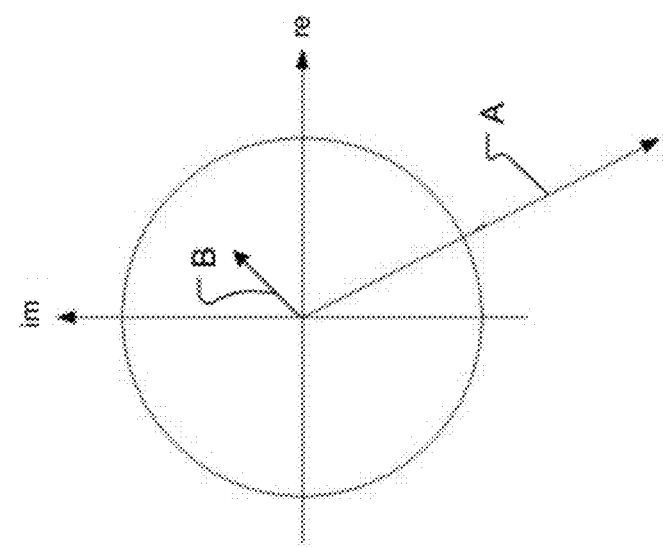
Figure 4:
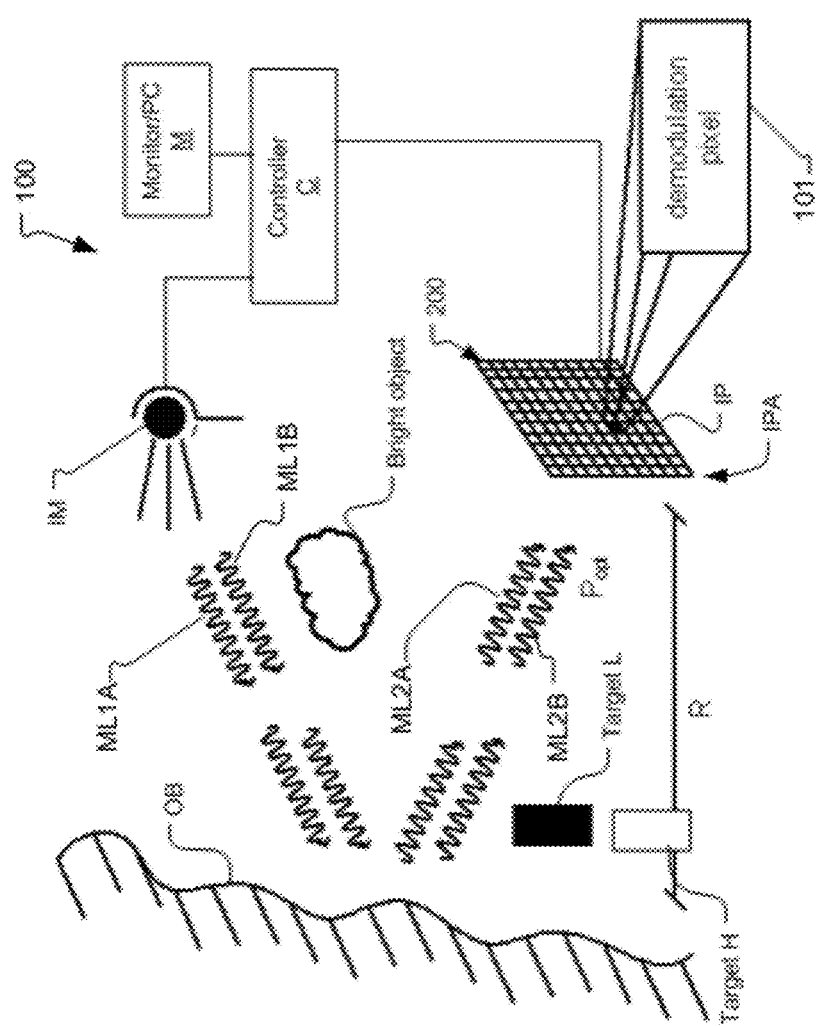
FIG. 4 is a schematic diagram showing the operation of a TOF camera.

FIG. 4 illustrates the basic principle of a 3D-measurement camera system 100 based on a sensor 200 comprising a two dimensional array of the demodulation pixels 101.

Intensity modulated illumination light ML1A at a first modulation frequency from an illumination module or light source IM is sent to the object OB of a scene. A fraction of the total optical power sent out is reflected to the camera 100 and detected by the 3D imaging sensor 200 as reflected light ML2A.

Each pixel 101 of the sensor 200 is capable of demodulating the impinging light signal ML2 as described above.

A controller C regulates the timing of the camera 100 so that the demodulation is synchronous with the modulation of light ML1A of the light source IM. The phase values of all pixels correspond to the particular distance information of the corresponding point in the scene. The two-dimension gray scale image with the distance information is converted into a three-dimensional image by the controller C. This is displayed to a user via display M or used as a machine vision input.

The distance R for each pixel is calculated by $$R=(c*TOF)/2,$$

with c as light velocity and TOF corresponding to the time-of-flight. Continuously intensity-modulated light is sent out by the illumination module or light source IM, reflected by the object and detected by the sensor 200. With each pixel 101 of the sensor 200 being capable of demodulating the optical signal at the same time, the sensor is able to deliver 3D images in real-time, i.e., frame rates of up to 30 Hertz (Hz), or even more, are possible. Continuous sine modulation delivers the phase delay (P) between the emitted signal and the received signal, also corresponding directly to the distance R:

$$R=(P*c)/(4*pi*fmod),$$

where fmod is the modulation frequency of the optical signal ML1A generated by light source IM. Typical state-of-the-art modulation frequencies range from a few MHz up to a few hundreds of MHz or even GHz.

Figures 5A, 5B:
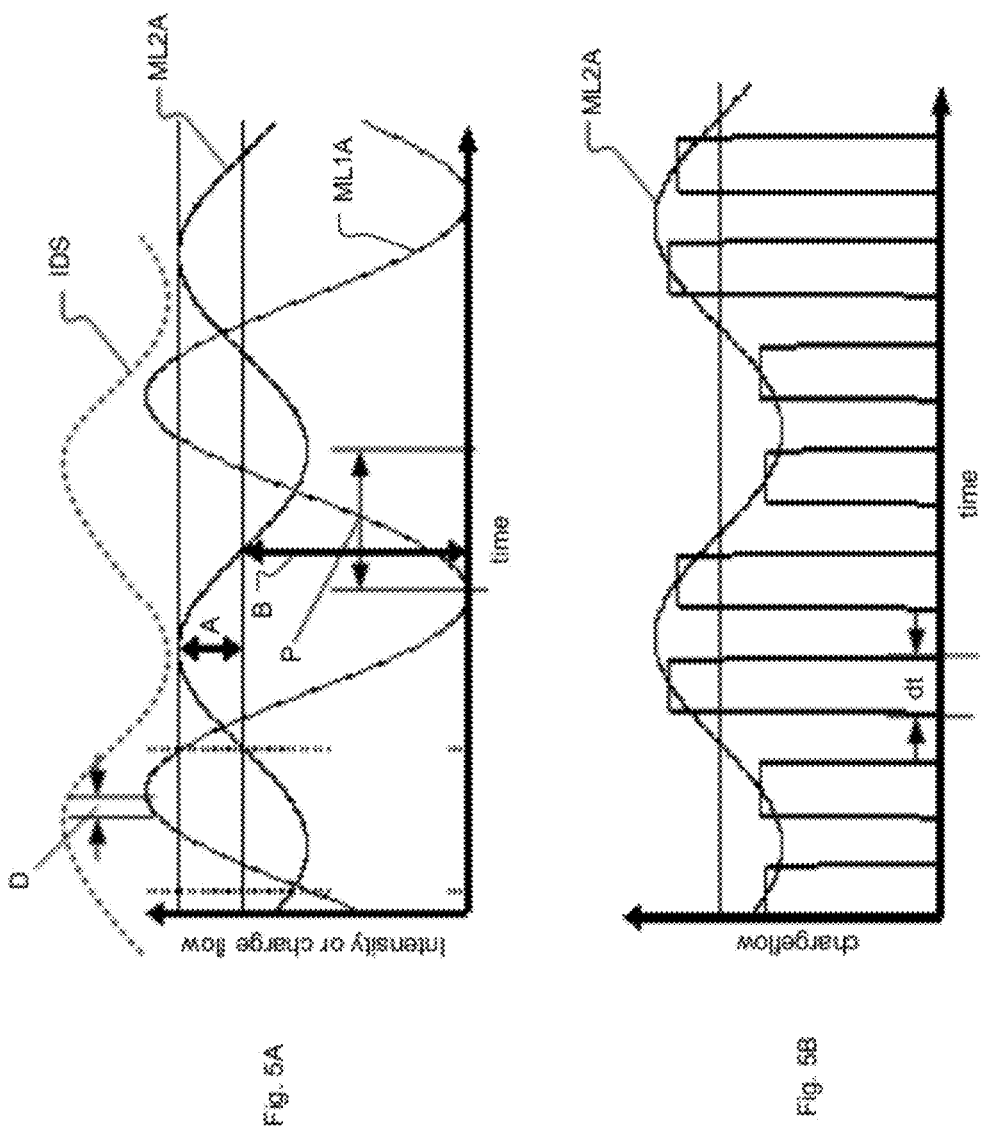
FIGS. 5A and 5B are plots showing light intensity as a function of time illustrating the relationship between signals for the case of continuous sinusoidal modulation and the signal sampling.

FIGS. 5A and 5B show the relationship between signals for the case of continuous sinusoidal modulation and the signal sampling.

FIG. 5A shows both the modulated emitted illumination signal ML1A and received signal ML2A. The amplitude A, offset B of the received signal ML2A and phase P between both signals are unknown, but they can be unambiguously reconstructed with at least three samples of the received signal. BG represents the received signal part due to background light.

In FIG. 5B, a sampling with four samples per modulation period is depicted. Each sample is an integration of the electrical photo-signal in the integration gates or diffusion regions within each pixel 101 of the sensor 200. The integration is performed over a duration dt that is a pre-defined fraction of the modulation period. Typically, in demodulation pixels with 4 integration sites dt corresponds to a quarter of the period. In order to increase the signal to noise ratio of each sample the photo-generated charges may be accumulated over several—up to more than 1 million—modulation periods in the integration sites.

The electronic timing circuit or controller C, employing for example a field programmable gate array (FPGA), generates the signals for the synchronous channel activation in the demodulation stage.

Using these four samples, the three modulation parameters amplitude A, offset B and phase shift P of the modulation signal can be extracted by the equations $$A=sqrt[(A3-A1)^2+(A2-A0)^2]/2$$

$$B=[A0+A1+A2+A3]/4$$

$$P=\arc\tan\ [(A3-A1)/(A0-A2)]$$

The distance measurement scheme is based on the assumption that the modulated illumination travels directly from the illumination LEDs IM to the object and back to the sensor 200 of the camera, so that the total distance traveled by the light is twice the distance from the camera to the object. However, it is possible that objects may be arranged in the scene such that light takes a less direct path than this.

For example, the light ML1A from the illumination module IM may be reflected by a first object before being reflected by the measured object and finally return to the camera sensor 200. In this situation the light travels by the direct and also indirect paths. The apparent distance is then a weighted average of the path distances, weighted by the strength of signal returned via each path. The end result is that distance measurements are wrong.

Figures 6A, 6B:
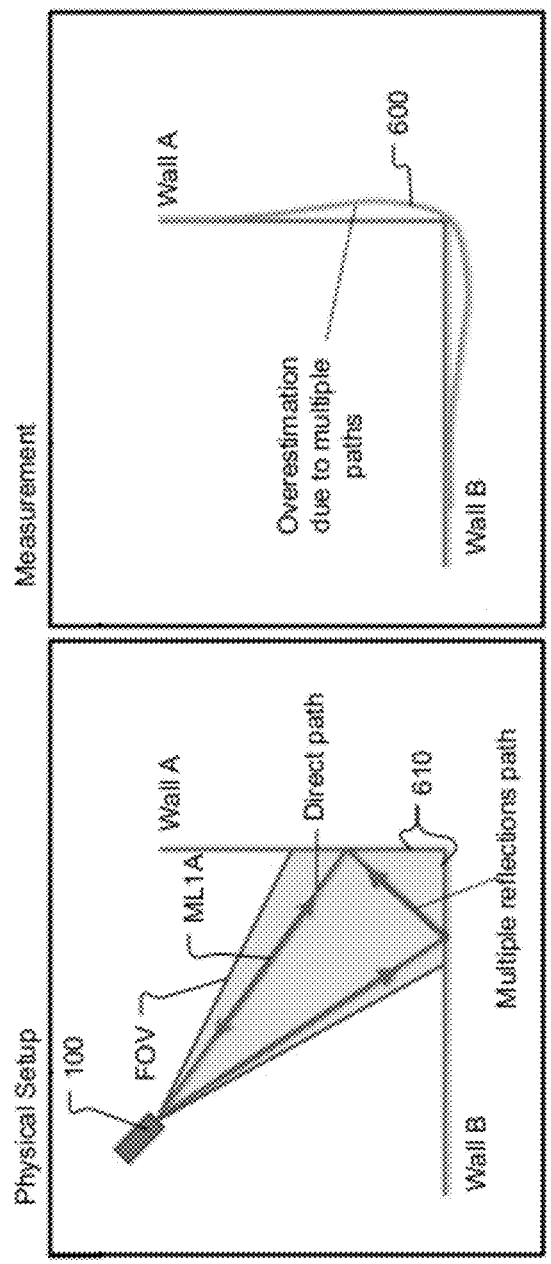
FIG. 6A illustrates multiple path reflections on a concave scene—in that case a corner between two walls.
FIG. 6B illustrates the apparent shape of the walls as measured by the TOF camera.
Figure 7:
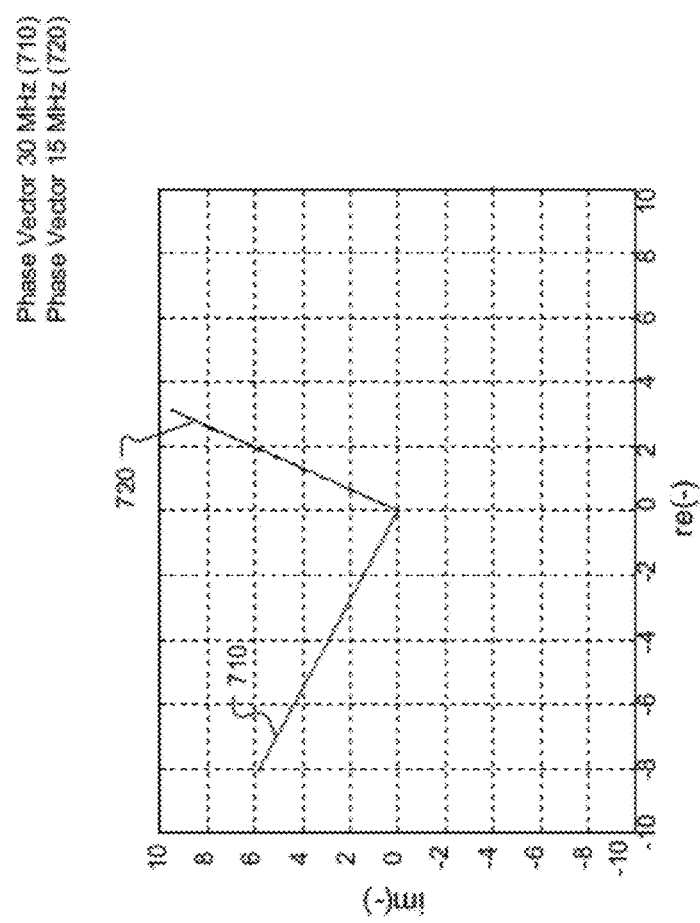
FIG. 7 is a phase diagram of a 15 and 30 MHz measurement without any multi-path, showing the phase vector for 30 MHz 710 and 15 MHz 720.
Figure 8:
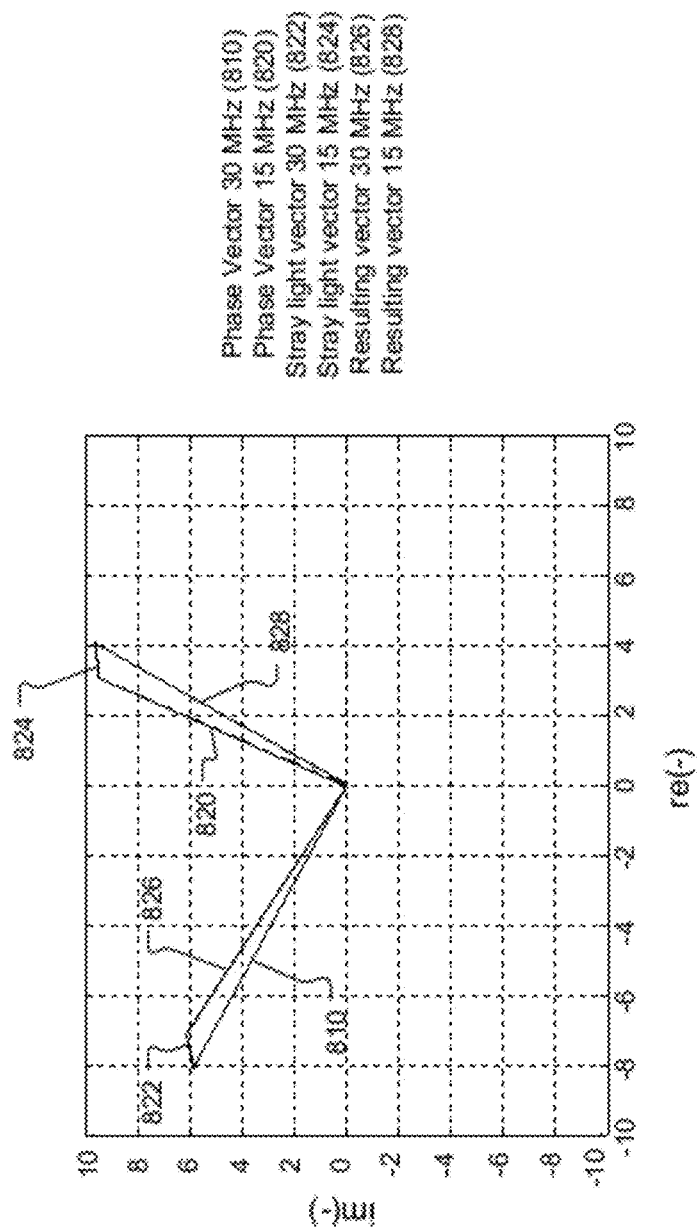
FIG. 8 is a phase diagram showing the vectors without any multi-path (phase vector 30 MHz 810, phase vector 15 MHz 820), the multi-path vectors (stray light vector 30 MHz 822, stray light vector 15 MHz 824) and the resulting vectors for 15 and 30 MHz (resulting vector 30 MHz 826, resulting vector 15 MHz 828).

Another common situation of multipath appears when measuring objects that have concave structures. A good example is when measuring a scene with a corner between two walls as illustrated in FIGS. 6A and 6B. In that case, the region of the walls right next to the corner 610 will be seen further away than it is in reality (see FIG. 6B, bowed grey line 600). This is due to the fact that a large portion of the light ML1A is reflected on the neighbor wall first (wall B), then on the measured wall (wall A) into the camera 100. The worst-case overestimation is in the region where multiple reflection paths are both, maximum in number and in intensity. This empirically explains the measured shape 600 of the walls, wall A, wall B.

For visualization purposes, the following description uses two modulation frequencies ML1A, ML1B for modulating the light source IM and detection by the sensor 200, see FIG. 4. In one example, modulation frequencies of 15 and 30 MHz are used in order to explain the compensation approach performed by the controller C. However, any other frequencies can be applied.

In some embodiments, the two modulation frequencies ML1A, ML1B are generated by the light source IM serially in time. In other embodiments, the two modulation frequencies ML1A, ML1B are generated by the light source IM simultaneously at two different wavelengths. In this later example, the sensor 200 comprises a wavelength discriminating sensor that can separately detect the two different wavelengths. One example is a sensor 200 with two different sensor pixel arrays and two bandpass filters. One of the bandpass filters passes the wavelength of the first modulation frequency to the first sensor pixel array of the sensor 200; and the other of the bandpass filters passes the wavelength of the second modulation frequency to the second sensor pixel array of the sensor 200.

In the absence of any multi-paths, the measured phase of a target at a range of e.g. 2 meters (m) needs to be:

$$\varphi = 2*pi*\frac{R_{target}}{R_{max}}$$

Where $R_{target}$ is the range of the target and $R_{max}$ corresponds to the non-ambiguity range, which is:

$$R_{max} = \frac{c}{F_{mod}}$$

$R_{max}$: non-ambiguity range
c: speed of light
$F_{mod}$: modulation frequency In the case of a camera modulating at 15 MHz, the non-ambiguity range becomes ~10 m, at a modulation frequency of 30 MHz corresponds to a 5 m non-ambiguity range.

In any measurement of a target smaller than 5 m, the phase measured by the 30 MHz camera has to be two times the phase measured with the 15 MHz.

In 3D TOF systems, the phase is typically reconstructed based on four samples on the impinging sine, $A_{0°}$, $A_{90°}$, $A_{180°}$ and $A_{270°}$. The following equation is used to calculate the phase:

$$\varphi = \arctan\left(\frac{x}{y}\right) = \arctan\left(\frac{A_{270°} - A_{90°}}{A_{0°} - A_{180°}}\right)$$

In case of the target being at 2 m, the phases are:
$\phi_{30\ MHz}=144°$
$\phi_{15\ MHz}=72°$ Assuming now we have a close object generating stray light, a disturbing stray light vector has to be added to the vector generated by the target. The resulting vector therefore includes the error that is measured without compensating for any multi-path.

The error caused by the indirect measurement (multi-path) depends on its phase and its amplitude with respect to the phase and amplitude of the direct measurement.

In an analytical form, the measured vector can be described as:

$\vec{V}_{measured}=\vec{V}_{direct}+\vec{V}_{indirect}$

Furthermore, we know that looking at the direct measurement only, $\phi_{30\ MHZ,\ direct}=2*\phi_{15\ MHZ,\ direct}$ In the case that $\phi_{30}$ is not within a certain phase noise interval $2*\phi_{15}$, the controller C assumes the presence of multi-path in the measurement. The phase noise interval can be determined by the estimated noise level on the measured range value.

That means:

$\varphi_{30MHz,direct} =$
$2*\varphi_{15MHz,direct} = \arctan2(y_{meas,30} - y_{indirect,30}; x_{meas,30} - x_{indirect,30}) =$
$2*\arctan2(y_{meas,15} - y_{indirect,15}; x_{meas,15} - x_{indirect,15})$ While $x_{meas}$ and $y_{meas}$ are known, $x_{indirect}$ and $y_{indirect}$ are derived from the indirect vector as:

$x_{indirect,30}=A_{indirect,30}*\cos(\phi_{indirect,30})$ $y_{indirect,30}=A_{indirect,30}*\sin(\phi_{indirect,30})$ $x_{indirect,15}=A_{indirect,15}*\cos(\phi_{indirect,15})$ $y_{indirect,15}=A_{indirect,15}*\cos(\phi_{indirect,15})$ Since the indirect path is the same for the 30 MHz and the 15 MHz measurements, therefore:

$\phi_{indirect,30}=2*\phi_{indirect,15}$

This means, we have the following remaining unknowns:
$\phi_{indirect,\ 15}$
$A_{indirect,\ 15}$
$A_{indirect,\ 30}$
Concerning the amplitudes, it can be further assumed that:

$$\frac{A_{indirect,15}}{A_{indirect,30}} = \frac{A_{direct,15}}{A_{direct,30}} = k$$

This assumption is appropriate since both amplitudes derive from measurements of the same objects. The ratio k of the direct amplitudes is generally known and constant for a 3D TOF system.

In this example, the controller C assumes that both amplitudes are the same, means the ratio k=1.
The result is the following equation:

arc tan $2(y_{meas,30}-A_{indirect,30}*\sin(2*\phi_{indirect,15}); x_{meas,30}-A_{indirect,30}*\cos(2*\phi_{indirect,15}))=2*$arc tan $2(y_{meas,15}-A_{indirect,30}*\sin(\phi_{indirect,15}); x_{meas,15}-A_{indirect,30}*\sin(\phi_{indirect,15}))$ The last two unknowns are:
$\phi_{indirect,\ 15}$
$A_{indirect,\ 15}$ Based on iterative approximations methods, these two unknown are found or at least estimated by the controller C. The indirect vector can therefore be determined and the measurement compensated by the controller C and the compensated image displayed on the monitor M.

In another embodiment, the basic vector equation of the multi-path problems is recognized as:

$\vec{V}_{measured}=\vec{V}_{direct}+\vec{V}_{indirect}$

The measurement is compensated by the controller C by optimizing the vectors in such a way as to best possibly fulfill the following the restrictions of the direct and the indirect path:
Direct path:

$$\varphi_{30MHz,direct} = 2*\varphi_{15MHz,direct}$$

$$\frac{A_{direct,15}}{A_{direct,30}} = k \text{ or if } k=1 => A_{direct,15} = A_{direct,30}$$

Direct path:

$$\varphi_{30MHz,indirect} = 2*\varphi_{15MHz,indirect}$$

$$\frac{A_{indirect,15}}{A_{indirect,30}} = k \text{ or if } k=1 => A_{indirect,15} = A_{indirect,30}$$

While this invention has been particularly shown and described with references to preferred embodiments thereof, it will be understood by those skilled in the art that various changes in form and details may be made therein without departing from the scope of the invention encompassed by the appended claims.

What is claimed is:

1. A time of flight three dimensional imaging system, comprising:
   an illumination module that generates modulated light that is intensity modulated at a first frequency and at a second frequency;
   a sensor that detects the modulated light at the first frequency and at the second frequency; and
   a controller that generates a three dimensional image from the detected modulated light at the first frequency and at the second frequency and compensates for multipath error in the three dimensional image arising from the modulated light traveling an indirect path before detection based, at least in part, on a relationship between (i) a ratio of the generated modulated light at the first frequency and the generated modulated light at the second frequency, and (ii) a ratio of the detected modulated light at the first frequency and the detected modulated light at the second frequency.

2. A system as claimed in claim 1, wherein the controller determines a vector associated with the multipath error by estimating a phase and an amplitude of the modulated light that traveled the indirect path and corrects a depth measured by the controller based on the vector.

3. A system as claimed in claim 2, wherein the controller uses iterative approximations to determine the vector.

4. A time of flight three dimensional imaging method, comprising:
   generating modulated light that is intensity modulated at a first frequency and at a second frequency;
   detecting the modulated light at the first frequency and at the second frequency;
   generating a three dimensional image from the detected modulated light; and
   compensating the three dimensional image for multipath error arising from the modulated light traveling an indirect path before detection based, at least in part, on a relationship between (i) a ratio of the generated modulated light at the first frequency and the generated modulated light at the second frequency, and (ii) a ratio of the detected modulated light at the first frequency and the detected modulated light at the second frequency.

5. A method as claimed in claim 4, further comprising determining a vector associated with the multipath error by estimating a phase and an amplitude of the modulated light that traveled the indirect path and correcting a depth based on the vector.

6. A method as claimed in claim 5, further comprising using iterative approximations to determine the vector.

7. A system as claimed in claim 1, wherein the illumination module generates the modulated light at the first frequency and the second frequency serially in time.

8. A system as claimed in claim 1, wherein the illumination module generates the modulated light at the first frequency and the second frequency simultaneously but at different optical wavelengths.

9. A method as claimed in claim 4, further comprising generating modulated light at the first frequency and the second frequency serially in time.

10. A method as claimed in claim 4, further comprising generating the modulated light at the first frequency and the second frequency simultaneously but at different optical wavelengths.

* * * * *